United States Patent
Soldavini

[11] 3,757,503
[45] Sept. 11, 1973

[54] LAWNMOWER AND GRASS COLLECTOR

[76] Inventor: Theodore Soldavini, 2 Via Trento Cassano d. adda, Milano, Italy

[22] Filed: May 4, 1972

[21] Appl. No.: 250,271

[30] Foreign Application Priority Data
May 10, 1971  Italy .............................. 24312 A/71

[52] U.S. Cl. ................................................ 56/202
[51] Int. Cl. ............................................ A01d 35/22
[58] Field of Search ..................................... 56/202

[56] References Cited
UNITED STATES PATENTS
| | | | |
|---|---|---|---|
| 3,143,842 | 8/1964 | Mattson et al. ........................ | 56/202 |
| 3,065,588 | 11/1962 | Shaw ..................................... | 56/202 |
| 3,494,116 | 2/1970 | Lempke ................................. | 56/202 |

*Primary Examiner*—Antonio F. Guida
*Attorney*—Michael S. Striker

[57] ABSTRACT

The specification describes a lawnmower having a motor driven grass cutting and centrifuging rotor operating into an open-bottom casing having an outlet passage for blowing cut grass and mulch carrying air into a collecting box. The collector box has an open face greater than the outlet of the passage and amply circumscribing the same. Screen means are located in the area of said open face obout said outlet for holding back the grass from the air flow reversed in said collector and passing through said screen means, and downwardly deviated and open passages are provided downstream of said screen means in said area for deviating and exhausting on the ground the air and mulch escaping from the collector.

10 Claims, 8 Drawing Figures

PATENTED SEP 11 1973 3,757,503
SHEET 1 OF 3
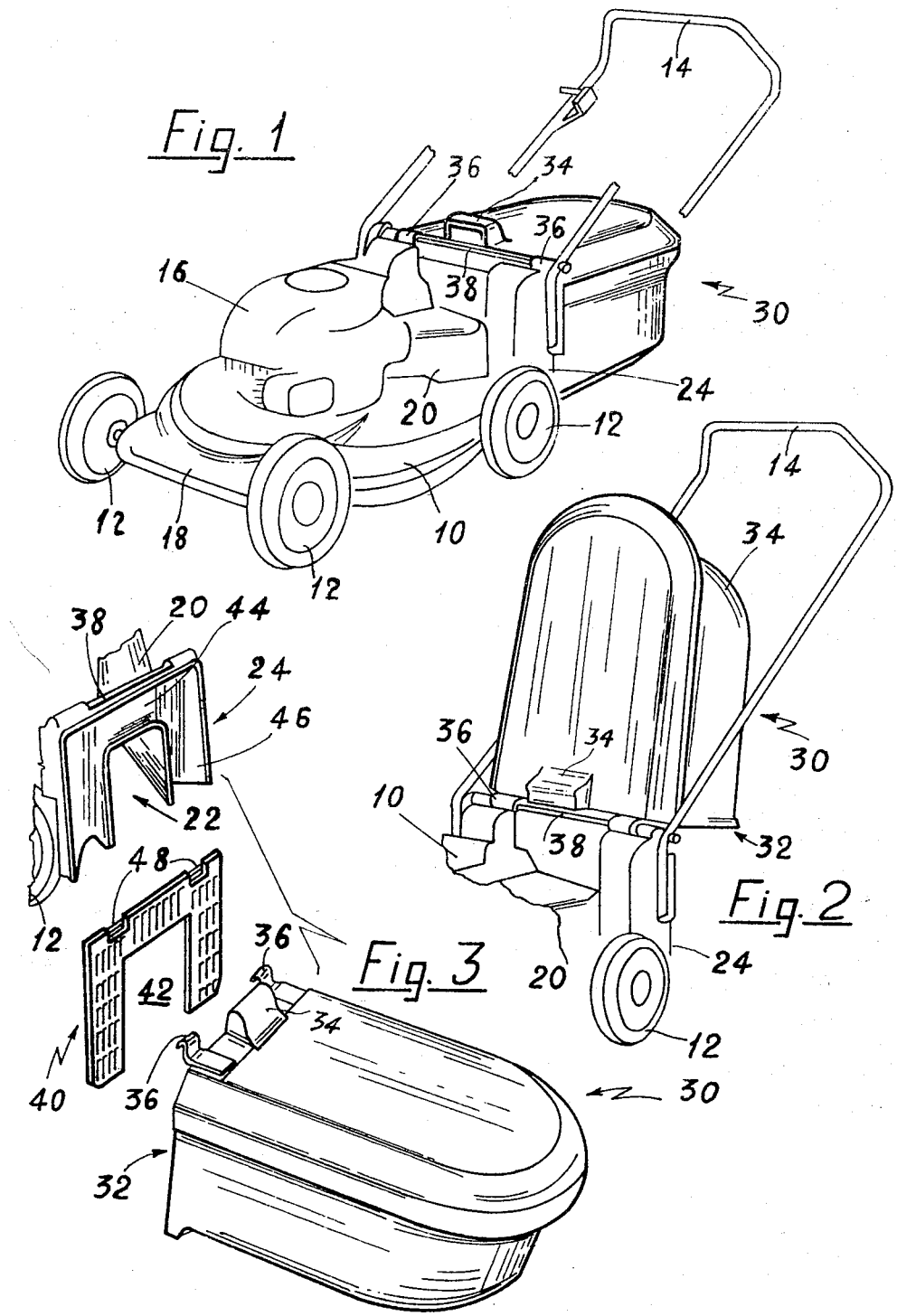

LAWNMOWER AND GRASS COLLECTOR

BACKGROUND

1. Field of the Invention

The present invention generally relates to lawnmower apparatus and more particularly it is concerned with a rotary type mower having a rotor supported and driven for fast rotation about a vertical axis and a plurality of grass cutting blades and of fan blades circumferentially attached to the rotor. The rotor is disposed within a generally circular housing having a tangentially arranged outlet passage and a box-like grass collector or catcher has an inlet opening facing said outlet passage. Such lawnmowers comprise a gasoline and in some occurrences an electric motor for driving the rotor and, when desired, for moving the apparatus on the ground.

2. Prior Art

Several types of such lawnmowers have been heretofore proposed and manufactured. When a lownmower of the character described is operated, the rotor either performs the grass cutting and, acting as a centrifugal fan, produces a draught which blows the cut grass out from the tangential passage and into the grass catcher. At its turn, such catcher is necessarily arranged for providing exhaustion of the air blown while preventing as far as possible from taking the cut grass out with it from the catcher. Generally, the centrifugated air flow carries fine debris and particles, pulverized earth therewith, and this mass, known as mulch, should desirably be caused to fall onto the lawn and become part of the compost around the roots of the grass.

The problem of selectively and positively collecting the cut grass within a suitable collector and of exhausting the blown air and concurrently properly return the mulch onto the lawn, has not been satisfyingly solved by known lawnmowers. Among other drawbacks, the more or less upwardly ejected dust carrying exhausted air is seriously disturbing the operator, in particular when operating in hot weather on pretty dry lawns. The mulch is spread into the air and the finer particles are carried away by wind.

For the purpose of preventing the exhausted air to taking the cut grass out from the opening through which the blown air is vented to atmosphere, it is usual to provide the grass boxes of such mowers with one or more air exhaust openings provided with louvres or a screen set in one or more walls of the box, and in some occurrence in the ceiling wall thereof. The disadvantage of this arrangement is that if the openings in the screen or the openings between the louvres are made sufficiently large to ensure that there is no excessive impedance to the air flow, some of the grass tends to pass through them, and, if, on the other hand, they are made sufficiently fine to hold back all the grass in the box, they tend to stop the draught through the box and so reducing the efficiency with which the grass is blown from the casing into the box. Grass boxes have been proposed and made in which the whole or part of the top wall of the box is perforated or made of mesh. This ensure an adequate air flow but in dusty conditions fine dust is blown upwards over the operator of the mower.

SUMMARY OF THE INVENTION

In order to remove the greater part of the above drawbacks, the invention provides a new and advantageous structure of a lawnmower of the character referred to above and of a grass collector therefor, so arranged that the air stream and the cut grass carried thereby are completely and undisturbedly supplied within a box-like grass collector, wherein the direction of the air is nearly completely inverted to facilitate retaining of the cut grass in said collector, and then, upon passage through screening passages, the air flow carrying the finer solid particles in suspension therewith, is downwardly deviated towards the ground beneath the mower, therefore causing the mulch to immediately fall on the mowed lawn.

Another object of this invention is to provide a new and improved grass collector so arranged that prompt and complete emptying thereof is facilitated.

According to the invention, there is provided a lawnmower frame structure supported by two pairs of wheels and carrying a conventional rotor adapted for grass cutting and centrifugation, a motor drivingly connected to said rotor, and a casing about said rotor and having a tangential passage having an oulet opening at one, fore or rear, end portion of the structure. Such end portion comprises a front member larger than said outlet opening and at least partly circumscribing same. The lawnmower comprises also a box-like grass collector having a completely open front face and completely closed top, bottom and side walls, the said front face being of outer contour matching the contour of said front member, and the collector is supported by said structure end portion so that its said open front face is detacheably juxtaposed with said front member spanning about the said passage outlet opening. Screen means, such as a mesh, or a perforated plate or a louvre, is arranged between the said juxtaposed front face and front member on the area comprised between the inner contour defined by said outlet opening and the outer contour of said front member. Further, the said front member has passages formed therein, which are either frontally open at said area and downwardly open for downwardly deviating and exhausting the air and the mulch blown off said collector and passing through said screen means in said area.

Most preferably, the said front member and face are planar and vertically arranged in the lawnmower and collector, and their matching contours define a rectangle higher and wider than the outlet opening circumscribed thereby, and the said screened area has parts extended either above and at both sides of said passage.

Also preferably, the said grass collector has its maximal cross-sectional area at its said completely open front face, so that, upon spacing such open front face from said screen means, the said collector will be provided with a discharge opening for the most ready disposal of the collected cut grass therefrom.

These and other objects and advantages of the invention will be made apparent as this description proceeds, and preferred examples of the invention will be now described with reference to the accompanying drawings, forming an essential component of this disclosure, and wherein the various devices which are not individually considered characteristic of the invention have been diagrammatically illustrated as appertaining to the current knowledge of those skilled in art and easily conceivable.

THE SEVERAL FIGURES OF THE DRAWINGS

FIG. 1 is a diagrammatical perspective view of a first embodiment of the lawnmower and collector of the invention, in operation;

FIG. 2 is a similar but fragmentary view of same, having the cut grass collector raised for disposing the cut grass therefrom;

FIG. 3 is a simplified perspective fragmentary exploded view of components combined and arranged according to the invention;

DETAILED DESCRIPTION OF THE PREFERRED EMBODIMENTS

Figure 4:
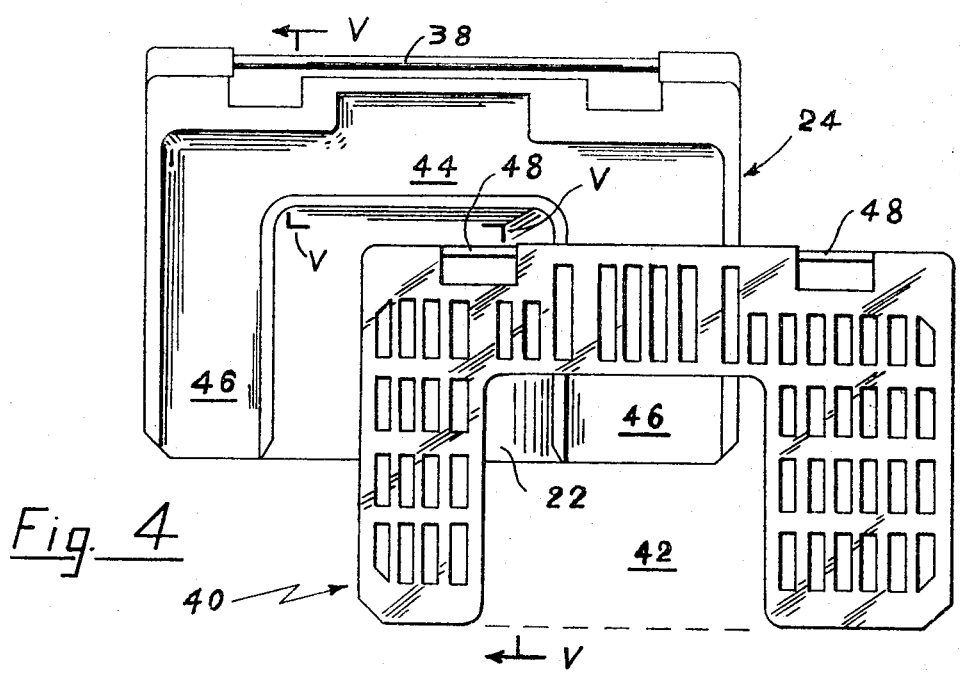
FIG. 4 is a front elevational view of a preferred embodiment of the front member and of the screen means, said components being laterally and vertically shifted from their operational arrangement for better illustration of some details.

Referring first to FIGS. 1 to 5, the invention therein illustrated comprises a rotary type mower the structure of which is generally indicated at 10, provided with two pairs of ground wheels 12, connected to said structure in any suitable arrangement, and, in this embodiment, with a handlebar 14 projecting upwardly and rearwardly from the structure for conveniently manipulating the mower. Such handlebar is partly broken away in the drawing.

Above the structure 10 a conventional motor, such as a gasoline engine generally indicated at 16, is suitably secured. Such motor means might as well consist of a battery or cable supplied electric motor, if desired. Such motor has or is drivingly connected to a vertical shaft (not shown) at the lower end portion of which there is secured the grass cutting and centrifuging rotor (not shown) of conventional type. This rotor is enclosed and operated within an open-bottom casing, generally indicated at 18, including a tangential outlet passage or chute 20 having its outlet at 22 (FIGS. 3 to 5) having a generally rectangular configuration wherein the lower horizontal side is missing. In the present instance, said chute 20 opens at 22 at the rear end of the structure 10.

At said its rear end, the said structure 10 has a front or head member secured to or integrally formed with. This member is generally indicated at 24, of generally rectangular configuration and defining a corresponding outer contour lying in a generally vertical plane. This arrangement is preferred but not critical for the invention, and such contours can well be somewhat inclined from vertical and/or not planar. This contour amply circumscribes the contour of the outlet 22 of the chute 20, which is arranged in the lower and center portion of said front member 24. Therefore a pretty large area is confined by the outer contour defined by the upper and side edges of member 24 and the inner contour defined by the corresponding edges of the outlet 22 of the chute or tangential passage 20 from the casing 18 of the rotor.

Figure 5:
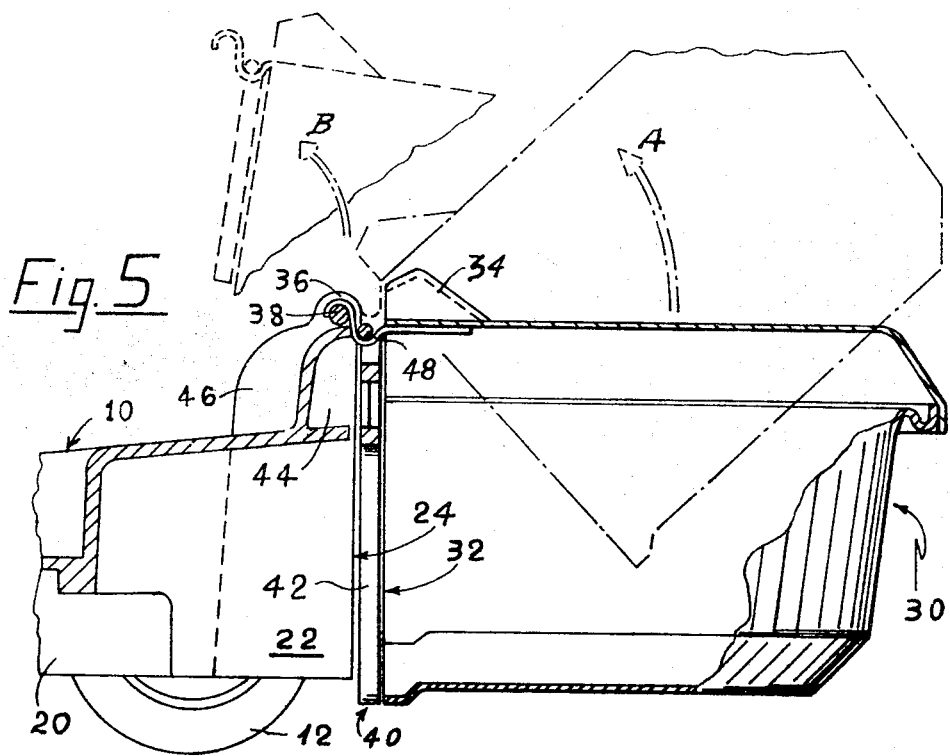
FIG. 5 is a rather simplified longitudinal vertical sectional view of the grass collector and of the parts adjacent thereto, the screen means and the front member being sectioned in the planes indicated at V—V—V—V in FIG. 4.

The grass catching collector is generally indicated at 30 and consists of a suitably shaped box which is completely open at one its front face 32. This collector can be made of metal, plastics or other suitable material, and has bottom, top and side walls impervious to air. The open front face 32 of the collector 30 is of dimension and configuration matching with that of the outer contour of front face 24 of the lawnmower and can be juxtaposed thereon. Preferably, the lower horizontal side of said open front face 32 is however at a level slightly lower than the lower parts of said front member 24, as shown in FIG. 5. Further, the opposite face of the collector is suitably rounded and the side walls of the collector are slightly diverging towards the said open face 32. Therefore, such open face 32 defines an opening of area larger than that defined within any cross-section of the collector box, in any plane parallel to that defined by such open face.

It will be evident that such configuration and opening of the collector box facilitates at best the removal of the cut grass collected thereinto, upon the operation of the lawnmower, when any obstruction will be removed from said front face and the collector will be downwardly turned for disposing of the grass therefrom.

Further it will be evident that, when the said open front face 32 will be juxtaposed to the said lawnmower front member 24, the outlet opening 22 of the chute 20 will cover a part only of the area defined within the contour of said opening of the collector.

The collector 30 is detacheably supported in facing relationship with said front member 24. For example, the collector box, suitably provided with a handle 34 for easy manipulation, is hingedly connected to said front member about a horizontal axis parallel and adjacent to the upper edges of said components. For example, suitable curved plates 36 are riveted or otherwise secured to the top of the collector box 30 for hingedly saddling over a horizontal rod 38 secured to the top of said front member 24, so that the said collector can be upwardly rotated as indicated by arrows A in FIG. 5, wherein the partially raised collector is partially illustrated in dot-and-dash lines. Suitable latch means (not shown) can be provided, if desired, for preventing unduly detachment of the collector from the lawnmower structure, when in operation, as caused by travelling on uneven ground, unaccurate driving and so on.

Upon de-latching of such means (if any), the collector can be completely detached from the lawnmower structure, as diagrammatically shown and indicated by arrow B in FIG. 5, if carrying of the collector box and emptying same far from the lawnmower is desired, for example in a location outside the lawn being cut.

Between the said collector 30, more particularly its open face 32, and the front member 24 screen means are arranged to screen the area defined between the above discussed inner an outer contours of said member 24, that is between the chute outlet 22 and the outer contour of member 24, that is the edge of the opening of the collector. Such screen means are generally indicated at 40 and have the general configuration of said area. In other words, such screen means 40 are such to cover said front member 24 and the opening of the collector, except at an inner area 42 facing the chute outlet 22, so that such outlet remains unobstructed.

This screen means 40 may consist of a suitable perforated metal plate or sheeting, or also of a suitable rigid metal mesh, or anyway by a grid apertured for substantially undisturbed air flow, but substantial holding back the grass. Such screen means 40 can be hingedly supported between said member 24 and open face 32 at its upper edge, for example by means of horizontal rods 48 rotatably seated upon same plates 36 of the collector.

Finally, the said front member 24 has frontally and downwardly open passages or hollows 44 and 46 formed at its area about the outlet 22 of the chute 20, that is in the area covered by the screen means 40, so that the air flow coming from the collector box 30 and passing through the apertures of said means 40 is caused to downwardly deviate and exhaust just above the ground on which the lawnmower is operated.

The operation of the lawnmower is evident: assuming that the apparatus is prepared for operation (FIGS. 1 and 5), and the rotor (not shown) is being rotated at the proper speed, a stream of air, carrying cut grass and more or less finely particulated mulch in suspension therewith, issues from chute 20 and its outlet 22, and passes into the collector box 30, through the unobstructed portion 42 of the screen 40. The flow of air is caused to reverse its direction for 180° about into the collector and flows back above and laterally to the inflowing stream for escaping through the ones passages available, that is the perforations of the screen 40, into the hollows 44 and 46 of the front member 24 for being finally directed on the ground beneath the lawnmower.

It has been found that the complete reversing of the direction of the air flow, within the collector 30, provides complete separation of the cut grass from the lighter and finer particles of mulch, so that in the collector essentially clean grass is collected. It has been also found that same reversing promotes regular and well progressive filling of the collector with grass, starting from the end opposite to said fully open end 32, so that the entire volume of the collector box can be most properly made use of for collecting cut grass. It has been further found that the fact that collector box has not discontinuities on any of its walls (such as that provided by screenings of the walls of known grass catchers) and has a wide opening, the cut grass can promptly fall as soon as the screen 40 is detached from its open face and the box is suitably raised in direction A (FIG. 5). The fact that the air flow is downwardly only exhausted ensures that the operator will not at all be disturbed by air exhaustion. It has been still further found that the downward deviation of the exhausted air prevents formation of dust in the neighbouring atmosphere, even operating in the most dusty conditions.

Figure 6:
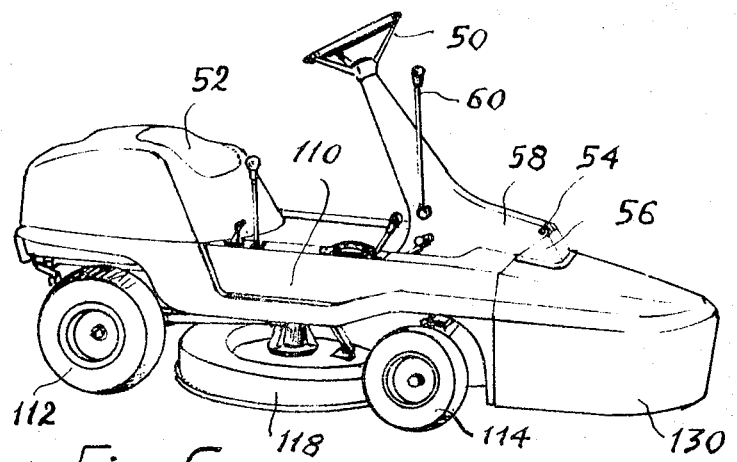
FIG. 6 is a diagrammatical perspective view of another embodiment of the invention, as embodied in a lawnmower so big and powerful for accomodation and trasport of the operator thereon.

The embodiment of FIGS. 1 to 5 illustrates a most simple and reliable manner of taking advantage of the invention in a relatively small and lightweight lawnmower. These and other advantages can however be taken by applying the concepts of the invention in lawnmowers of rotary type but of different and bigger structure, for example such as that shown in FIGS. 6, 7 and 8.

According to this second embodiment of the invention, the lawnmower comprises a simplified motor vehicle body 110 having motor driven rear wheels 112 and steerable front wheels 114 operator controlled by a suitable wheel 50 for example. The body 110 has a seat 52 for operator accomodation and suitable control and transmission means (not shown) for operating the lawnmower. The grass cutting and centrifuging conventional rotor (not shown) is arranged and operates within an open-bottom casing 118 having a tangential outlet chute 120 (partially shown in FIG. 8) projecting from an opening 142 provided into an apertured screen means 140 provided at the front member 124 of the body.

In same front member 124, rearwardly of the screening portions of the screen means 140, there are downwardly deviated and open passages similar to those indicated at 44 and 46 in FIGS. 3 to 5, and therefore not shown.

The tapered grass collector box 130 has a fully open front face 132 facing (in operation) the said front member 124, and the operation of the lawnmower, as far as cut grass collecting and air and mulch exhaustion are concerned with, completely corresponds to that described above with reference to FIGS. 1 to 5.

Figure 7:
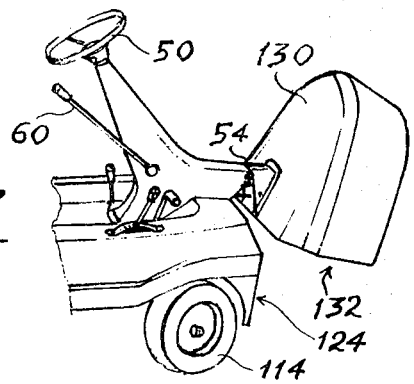
FIG. 7 is a fragmentary view of same, upon raising of the collector for disposing of the cut grass therefrom.
Figure 8:
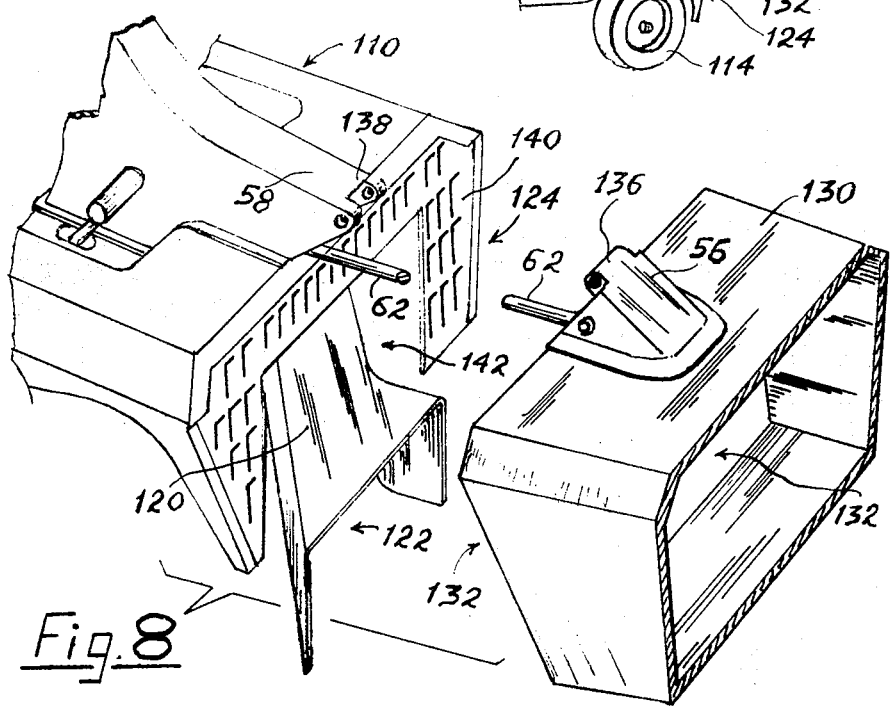
FIG. 8 is a fragmentary perspective exploded view of the front member and collector front face part of the lawnmower of FIGS. 5 and 6.

The said collector 130 is hingedly secured at 54 to the front member 124 of the body 110, by means of mating hinge components 136 and 138 provided on parts 56 and 58 secured to said collector box 130 and to said body 110, respectively. Such collector box 130 can be upwardly rotated, as shown in FIG. 7, for causing the collected grass to fall therefor for disposing it. Said rotation can be actuated by the operator accomodated on the seat 52, by suitable handle and transmission means. For example a lever 60 can be provided and mechanically connected by a connecting rod 62 (fragmentarily shown in FIG. 8) to the hingedly supported collecting box 130.

Although two embodiments of the invention have been described with a certain degree of particularly, it is to be understood that the present disclosure and the accompanying drawings have been made only by way of example and that numerous changes in the details of construction and the combination and arrangement of parts may be resorted by those skilled in the art to which this invention appertains, without departing from the spirit and scope of same invention, which should therefore be limited only by the appended claims.

I claim:

1. A lawn mower comprising a wheel-supported lawn mower body including an open-bottom substantially cylindrical casing adapted to house a rotor having grass cutting and air centrifugal blades, said casing having a substantially tangential passage provided with an outlet opening for issue of a cut grass and mulch carrying centrifugated air stream therefrom; motor means carried by said body for driving the rotor; a cut grass collector box having an open end facing and closely adjacent said outlet opening of said passage, said open end of said box being defined by an end edge of the box which encompasses an area considerably greater than that of said outlet opening of said passage, said box having top, bottom and side walls impervious to air; screen means apertured for the passage of air and mulch carried by the air stream but for holding back the cut grass, positioned to cover that part of said area of said open end of said box which is larger than the area of said outlet opening of said casing; and means on the side of said screen means facing away from the open end of said box for directing the stream of air and the mulch passing through said screen means out of said box downwardly towards the ground over which the lawn mower moves.

2. A lawn mower as defined in claim 1, wherein said lawn mower body has opposite ends and at one of its ends a substantially upright end member having an inner edge defining said outlet opening of said passage and an outer edge substantially matching said end edge of said box, and wherein means for directing the stream of air and the mulch contained therein downwardly comprises a groove extending into said end member between said inner and said outer edge and having at least one downwardly open end, said screen covering said groove at the side thereof facing away from said end member and said end edge of said open end of said box engaging said outer edge of said end member.

3. A lawn mower as defined in claim 2, wherein said inner and said outer edges are located in a substantially vertical plane.

4. A lawn mower as defined in claim 2, wherein said collector box is hingedly mounted on said end member for rotation about a substantially horizontal axis adjacent to an upper portion of said member.

5. A lawnmower and grass collector as defined in claim 4, wherein the said lawnmower comprises a motor driven and steerable vehicle having accomodations for carrying the operator thereon and therewith, lever means positioned for actuation thereof by the accomodated operator, and link means connecting such lever means to said hingedly supported collector box for raising such box up to cause the grass collected thereinto to fall therefrom upon actuation of said lever means.

6. A lawn mower as defined in claim 5, wherein said end member is integrally formed with the front end of said vehicle and said collector box projects forwardly of said front end.

7. A lawn mower as defined in claim 4, wherein said collector box is hingedly and detachably connected to the upper portion of said end member.

8. A lawn mower as defined in claim 4, wherein said lawn mower comprises a handlebar extending upwardly and rearwardly from said lawn mower body, and wherein said collector box is hingedly connected to a rear end of said body.

9. A lawn mower as defined in claim 2, wherein said outer edge of said end member is spaced upwardly and laterally to both sides of said inner edge thereof and wherein said groove comprises two substantially vertically downwardly extending groove portions open at their lower ends and a connecting portion connecting the upper ends of said two groove portions.

10. A lawn mower as defined in claim 1, wherein the area of said open end of said box is greater than the area of a cross section through said box in any plane parallel to said open end and wherein said walls of said box diverge toward said open end.

* * * * *